United States Patent
Lee et al.

(10) Patent No.: US 8,031,636 B2
(45) Date of Patent: Oct. 4, 2011

(54) METHOD AND APPARATUS FOR ANALYZING NETWORK HAVING A PLURALITY OF LINKS

(75) Inventors: Chul-ke Lee, Seoul (KR); Hong-kyu Jung, Daejeon-si (KR); Fei Fei Feng, Yongin-si (KR); Byung-suk Kim, Uiwang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 261 days.

(21) Appl. No.: 12/205,971

(22) Filed: Sep. 8, 2008

(65) Prior Publication Data
US 2009/0238092 A1    Sep. 24, 2009

(30) Foreign Application Priority Data
Mar. 21, 2008  (KR) .......................... 10-2008-0026367

(51) Int. Cl.
*H04L 12/28* (2006.01)
(52) U.S. Cl. ........................................ 370/254; 370/351
(58) Field of Classification Search .................. 370/229, 370/232, 235, 237, 252–254, 260, 261, 351, 370/394, 468, 487; 455/456.5
See application file for complete search history.

(56) References Cited

U.S. PATENT DOCUMENTS

| | | | |
|---|---|---|---|
| 4,916,694 A * | 4/1990 | Roth | 370/252 |
| 5,600,632 A | 2/1997 | Schulman | |
| 5,991,307 A * | 11/1999 | Komuro et al. | 370/473 |
| 6,038,230 A | 3/2000 | Ofek | |
| 6,081,844 A | 6/2000 | Nowatzyk et al. | |
| 6,104,729 A | 8/2000 | Hellum et al. | |
| 6,335,933 B1 * | 1/2002 | Mallory | 370/394 |
| 6,636,487 B1 * | 10/2003 | Roy | 370/260 |
| 6,674,726 B1 * | 1/2004 | Kado et al. | 370/253 |
| 2003/0137972 A1 * | 7/2003 | Kowalewski | 370/351 |
| 2005/0113116 A1 * | 5/2005 | Avidor et al. | 455/456.5 |
| 2005/0286432 A1 * | 12/2005 | Yasuie et al. | 370/244 |
| 2006/0083263 A1 * | 4/2006 | Jagadeesan et al. | 370/487 |
| 2007/0153916 A1 * | 7/2007 | Demircin et al. | 375/240.26 |

FOREIGN PATENT DOCUMENTS

| | | |
|---|---|---|
| JP | 2001-358793 | 12/2001 |
| KR | 10-2006-0096510 | 9/2006 |
| KR | 10-2007-0081407 | 8/2007 |

* cited by examiner

*Primary Examiner* — Andrew Lai
(74) *Attorney, Agent, or Firm* — NSIP Law, PC

(57) ABSTRACT

Provided are an apparatus for and a method of analyzing a network, for example, an asymmetric network having a plurality of links, and a wireless device for use in the network. A method of analyzing a network having a plurality of links includes performing one or more operations of sampling a packet interval between two packets transmitted consecutively, and analyzing configuration of the plurality of links included in the network based on the one or more sampled packet intervals.

12 Claims, 8 Drawing Sheets

METHOD AND APPARATUS FOR ANALYZING NETWORK HAVING A PLURALITY OF LINKS

CROSS REFERENCE TO RELATED APPLICATIONS

This application claims the benefit under 35 U.S.C. §119 (a) of a Korean Patent Application No. 10-2008-0026367, filed on Mar. 21, 2008 in the Korean Intellectual Property Office, the entire disclosure of which is incorporated herein by reference.

TECHNICAL FIELD

The following description relates to a method and an apparatus for analyzing a network, and more particularly, to a method and an apparatus for analyzing a network having a plurality of links.

BACKGROUND

A network may be formed between a femto cell base station inside a building and a Wibro base station outside of the building by connecting each other through a plurality of links. In this case, the femto cell base station and the Wibro base station should be temporally synchronized with each other. For example, where a user moves out of the building while making a phone call through the femto cell base station, the call is handed over to the Wibro base station, and the call quality may be substantially degraded if the time synchronization between the femto cell base station and the Wibro base station is not perfect. Hence, the femto cell base station needs to have the accurate time information synchronized with the Wibro base station.

To this end, the femto cell base station may include a global positioning system (GPS) receiver mounted thereon. However, since the femto cell base station is located inside the building, the GPS signals frequently fail to be received, and there may incur additional cost to mount the GPS receiver to the femto cell base station.

Alternatively, the femto cell base station may bring accurate time information from a different base station, for example, a master node, which has a GPS receiver. That is, the femto cell base station transmits a packet to a master node, and the master node receives the packet and returns the packet to the femto cell base station. The time spent for transmitting and returning the packet is called a round-trip delay, and a time difference between the femto cell base station and the master node is obtained by halving the round-trip delay. However, such a method may not be applied to an asymmetric network having a plurality of links with different uploading and downloading speeds, such as, but not limited to, an asymmetric digital subscriber line (ADSL) network.

SUMMARY

According to an aspect, there is provided a method of analyzing an asymmetric network having a plurality of links, and a method of performing time synchronization using the analyzing method.

According to another aspect, there is provided a method of analyzing a network having a plurality of links, the method including performing one or more operations of sampling a packet interval between two packets transmitted consecutively, and analyzing configuration of the plurality of links included in the network based on the one or more sampled packet intervals.

In the method, a plurality of the sampling operation may be performed, and the analyzing of the configuration of the plurality of links may include interpreting distribution of the sampled packet intervals using a look-up table that stores possible packet intervals of each link to detect the plurality of links included in the network.

The look-up table may store, according to each link speed, a packet interval calculated with respect to two consecutive packets and a packet interval calculated in consideration of at least one interfering packet cutting in between the two consecutive packets.

The sampling of the packet interval may include transmitting the two packets consecutively to a master node, receiving two packets from the master node each having a time stamp recorded therein, and sampling the packet interval with respect to each link by using the time stamp recorded in each packet.

In the method, a plurality of the sampling operations may be performed, and the analyzing of the configuration of the plurality of links may include recognizing distribution of the sampled packet intervals based on frequencies of the sampled packet intervals, detecting at least one spur of a packet interval with a comparatively high frequency, and identifying each link included in the network by using the detected at least one spur.

The identifying of the each link may include identifying the each link with reference to a look-up table that stores, according to each link speed, a packet interval calculated with respect to two consecutive packets and a packet interval calculated in consideration of at least one interfering packet cutting in between the two consecutive packets.

The network may be an asymmetric network having a plurality of links with different uploading and downloading speeds.

According to still another aspect, there is provided a time synchronization method in a network including a plurality of links, including performing one or more operations of sampling a packet interval between two packets transmitted consecutively, analyzing configuration of the plurality of links included in the network based on the one or more sampled packet intervals, obtaining a delay asymmetry ratio between an uplink and a downlink based on the analyzed link configuration; and performing time synchronization based on the obtained delay asymmetry ratio.

In the method, a plurality of the sampling operations may be performed, and the analyzing of the configuration of the plurality of links may include interpreting distribution of the sampled packet intervals using a look-up table that stores possible packet intervals for each link to detect the plurality of links included in the network.

The look-up table may store, according to each link speed, a packet interval calculated with respect to two consecutive packets and a packet interval calculated in consideration of at least one interfering packet cutting in between the two consecutive packets.

According to yet another aspect, there is provided an apparatus for use in a network having a plurality of links, the apparatus including a sampling unit which performs one or more sampling of a packet interval between two packets transmitted consecutively, and a link analyzing unit which analyzes configuration of the plurality of links included in the network based on distribution of the one or more sampled packet intervals.

The link analyzing unit may detect the plurality of links included in the network by interpreting the distribution of the one or more sampled packet intervals by use of a look-up table that stores possible packet intervals for each link.

The look-up table may store, according to each link speed, a packet interval calculated with respect to two consecutive packets and a packet interval calculated in consideration of at least one interfering packet cutting in between the two consecutive packets.

The apparatus may further include a synchronizing unit which obtains a delay asymmetry ratio between an uplink and a downlink based on the analyzed link configuration and performs time synchronization based on the obtained delay asymmetry ratio.

The network may be an asymmetric network having a plurality of links with different uploading and downloading speeds.

According to yet another aspect, there is provided a wireless device for use in a network having a plurality of links, the wireless device including a transceiver unit to transmit/receive data, and a processor unit to perform a handover from a first base station in the network to a second base station in the network, wherein the handover is performed based on time synchronization between the first and second base stations, and the time synchronization is performed based on a delay asymmetry ratio between an uplink and a downlink obtained by analyzing configuration of the plurality of links included in the network using sampled packet intervals.

Each of the sampled packet intervals may be obtained by transmitting two packets consecutively by one of the first and second base station to a master node and sampling a packet interval with respect to each link by using a time stamp recorded in each packet of two packets received from the master node corresponding to the transmitted two packets.

The delay asymmetry ratio may be obtained by analyzing the configuration of the plurality of links by interpreting distribution of the sampled packet intervals using a look-up table that stores possible packet intervals for each link to detect the plurality of links.

The look-up table may store, according to each link speed, a packet interval calculated with respect to two consecutive packets and a packet interval calculated in consideration of at least one interfering packet cutting in between the two consecutive packets.

The first and second base stations may be of different type, for example, a femto cell base station and a Wibro base station, respectively, and the network may be an asymmetric network having a plurality of links with different uploading and downloading speeds.

Other features will become apparent to those skilled in the art from the following detailed description, which, taken in conjunction with the attached drawings, discloses various aspects and examples.

BRIEF DESCRIPTION OF THE DRAWINGS

Throughout the drawings and the detailed description, unless otherwise described, the same drawing reference numerals will be understood to refer to the same elements, features, and structures.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, descriptions of well-known functions and constructions are omitted to increase clarity and conciseness. It is understood that the terminology used herein may be different in other applications or when described by another one skilled in the art.

Figure 1:
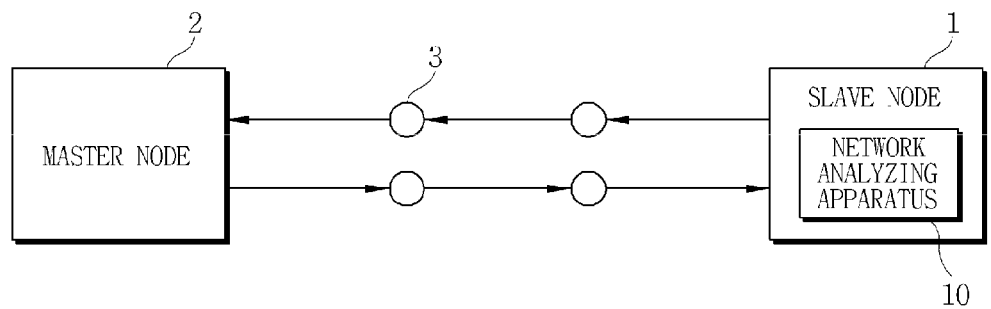
FIG. 1 is a block diagram illustrating an example of a configuration of a network having a plurality of links.

FIG. 1 shows an example of a network having a plurality of links. Referring to FIG. 1, the network comprises a slave node 1 and a master node 2. The slave node 1 includes a network analyzing unit 10 which analyzes an asymmetric network that has a plurality of links and performs time synchronization between nodes using the result of the analysis.

The network further includes a plurality of links each of which includes a plurality of intermediate nodes 3. Each of the intermediate nodes 3 may be a switch or a router, and the respective links may have various link speeds. For example, an asymmetric network such as an asymmetric digital subscriber line (ADSL) network may have an uploading speed and a downloading speed that are different from each other, and in such asymmetric network, the time spent to transmit a packet to a master node may be different from the time spent to receive the packet from the master node.

Accordingly, for accurate time synchronization, link speeds of intermediate links of an uplink from the slave node to the master node and of a downlink from the master node to the slave node may need to be analyzed. Through the result of the analysis, it may be possible to detect at which ratio a round-trip delay time is divided between the uplink and the downlink, and more accurate time synchronization may be realized by using the ratio.

Hereinafter, a method of analyzing a network by using the distribution of packet intervals and a method of performing time synchronization by using the result of the analysis will be further described.

Figure 2:
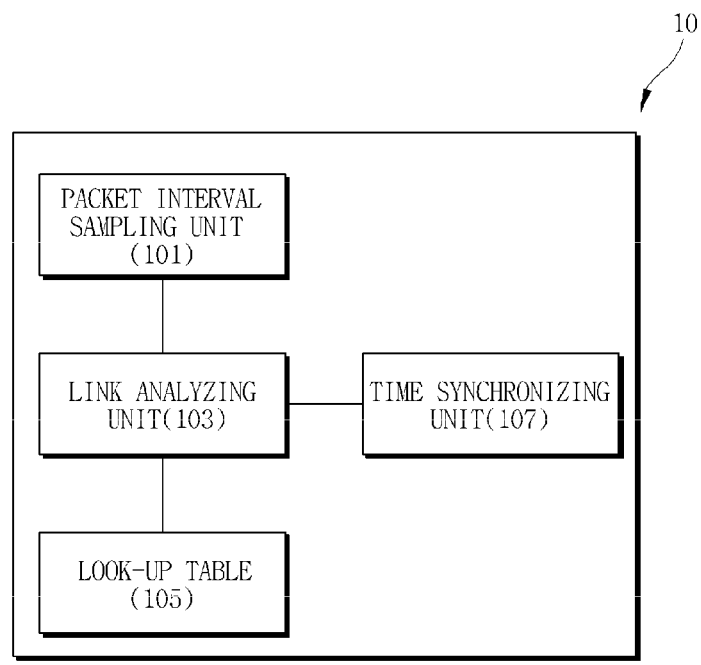
FIG. 2 is a block diagram illustrating an example of a configuration of a network analyzing apparatus.

FIG. 2 shows an example of a network analyzing apparatus 10. Referring to FIG. 2, the network analyzing apparatus 10 includes a packet interval sampling unit 101, a link analyzing unit 103, and a look-up table 105. The network analyzing apparatus 10 may further include a time synchronizing unit 107.

The packet interval sampling unit 101 samples an interval between receiving two packets that were transmitted consecutively.

The link analyzing unit 103 analyzes a configuration of a plurality of links included in the network based on the distribution of the packet intervals sampled by the packet interval sampling unit 101. The link analyzing unit 103 interprets the distribution of the sampled packet intervals using the look-up table 105 listing the possible packet intervals of each link, and identifies the plurality of links in the network.

The look-up table 105 stores a packet interval calculated with respect to two consecutive packets according to each link speed and a packet interval calculated in consideration of at least one interference packet between the two packets.

The time synchronizing unit 107 obtains a delay asymmetry ratio between the uplink and the downlink based on the configuration of the plurality of links analyzed by the link analyzing unit 103, and performs time synchronization based on the obtained delay asymmetry ratio.

Figure 3:
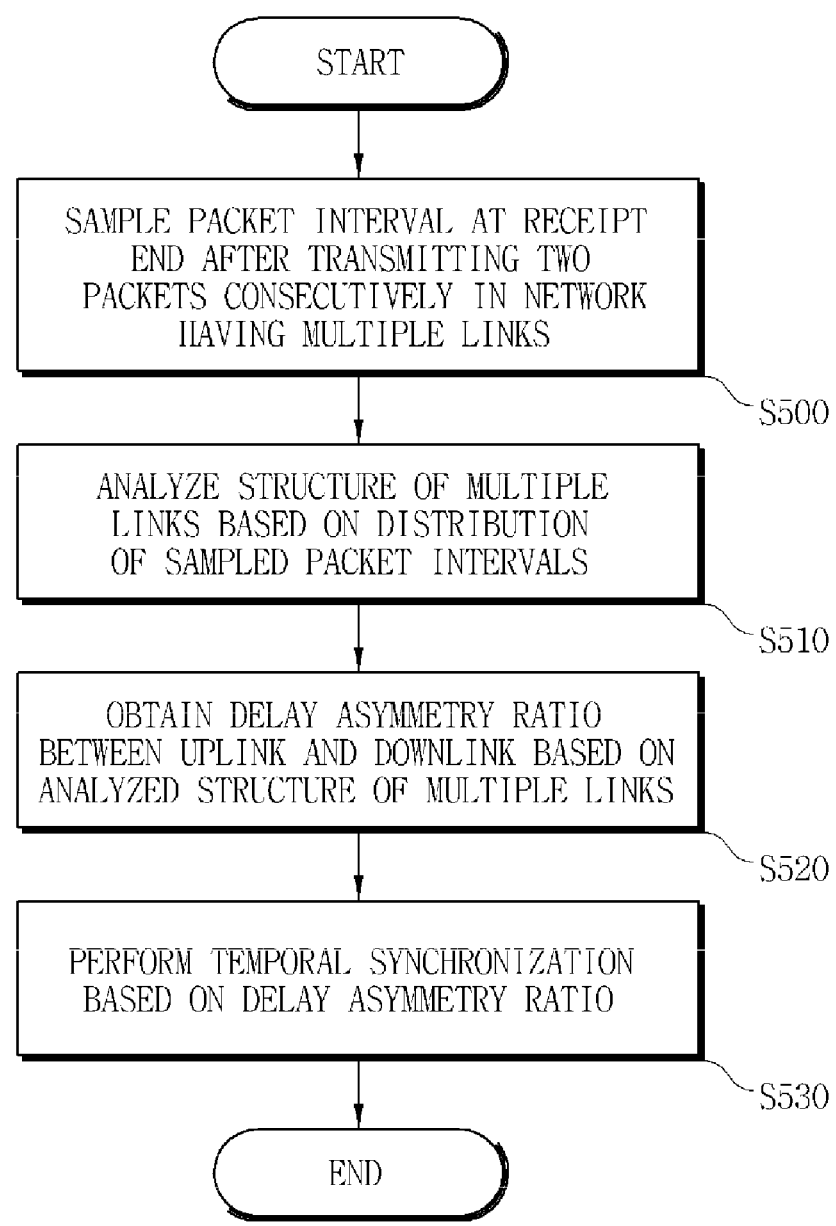
FIG. 3 is a flowchart illustrating an example of a network analyzing method.

FIG. 3 is a flowchart illustrating an example of a network analyzing method. Referring to FIG. 3, to analyze a network by using distribution of packet intervals, two packets are transmitted consecutively in a network including a plurality of links, and a packet interval of the two packets received by a slave node 1 is sampled in operation S500. The sampling operation may be repeated for a predetermined number of times.

The configuration of the plurality of links in the network is analyzed based on the sampled packet intervals in operation S510. At this time, the plurality of links in the network may be identified by interpreting the distribution of the sampled packet intervals with reference to a look-up table listing pre-calculated possible packet intervals for each link. The look-up table may store packet intervals calculated with respect to every two consecutive packets according to each link speed and packet intervals calculated in consideration of at least one interference packet between every two consecutive packets. Accordingly, in an asymmetric network having a plurality of links, each link may be analyzed by using the packet intervals.

To perform time synchronization in the asymmetric network, the result of analyzing the network may be used. That is, a delay asymmetry ratio between the uplink and the downlink is obtained based on the analyzed configuration of the plurality of links in operation S520, and the time synchronization is performed based on the obtained delay asymmetry ratio in operation S530. Accordingly, in the network having a plurality links, more accurate time synchronization may be realized by use of the asymmetry ratio between the uplink and the downlink which is obtained based on the analyzing result of each link.

Figure 4:
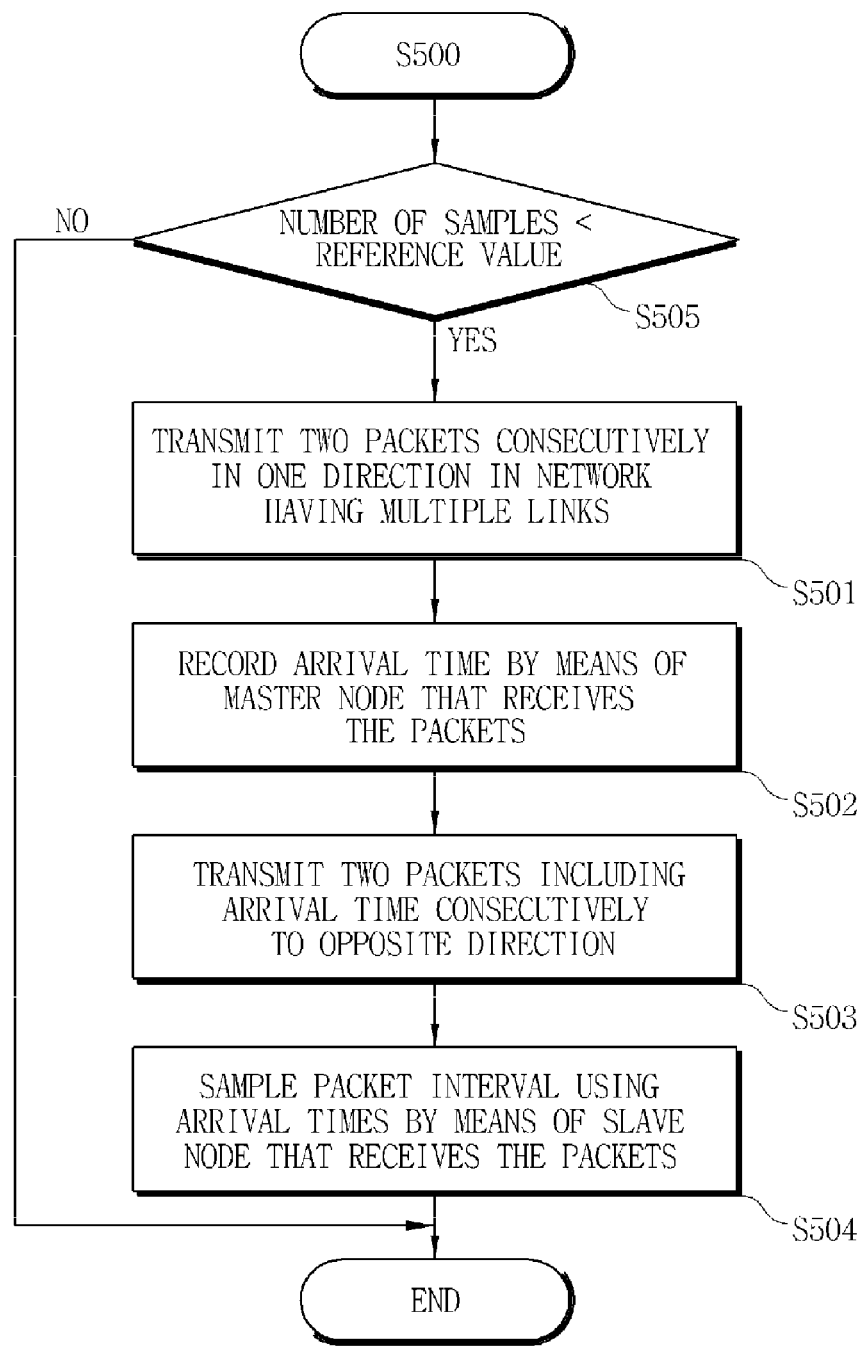
FIGS. 4 and 5 are flowcharts further illustrating examples of the network analyzing method of FIG. 3.
Figure 5:
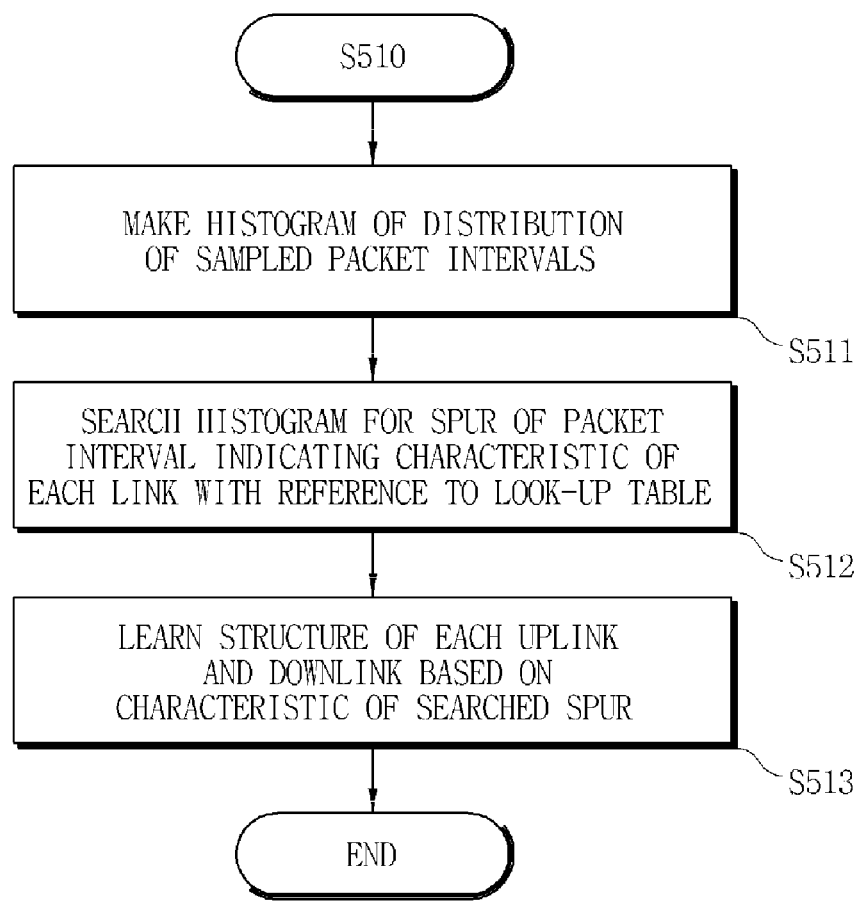

FIGS. 4 and 5 are flowcharts further illustrating examples of the network analyzing method of FIG. 3.

FIG. 4 further illustrates the operation S500 of sampling the packet interval. With reference to FIG. 1, in operation S501, the slave node 1 transmits two packets consecutively to the master node 2. In operation S502, the master node 2 that receives the packets records an arrival time in each of the packets and then transmits the packets consecutively to the slave node 1 in operation S503. In operation S504, the slave node 1 that has received the packets with its arrival time recorded therein samples a packet interval using the arrival times recorded in the packets. Operation S505 illustrates that such sampling operations, that is, the operations S501 to S504, may be repeated for a predetermined number of times.

FIG. 5 further illustrates the operation S510 of analyzing the network by using the sampled packet intervals. In operation S511, distribution of sampled packet intervals is obtained on the basis of the frequencies of the packet intervals sampled in the operation S500 of FIG. 4. As an example, a histogram of the sampled packet intervals is made. As described later, the sampled packet intervals have at least one spur of the packet interval, which has higher frequencies than the other packet intervals. In operation S512, with reference to the pre-stored look-up table (not shown), the spur of the packet interval which shows a characteristic of each link is searched from the distribution of the sampled packet intervals. In operation S513, the configuration of each of the uplink and the downlink is learned from the characteristic of the searched spur of the packet interval.

Hereinafter, examples of a specified algorithm for detecting a network configuration by using sampled packet intervals will be described. According to the examples, a packet interval between two packets is used to detect what links are included in a network.

For example, it is assumed that it takes 64 µs to transmit a packet of 64 bytes through a link with a speed of 100 Mb/s. In this case, even where a sending side transmits two packets as consecutively as possible, the packet interval cannot be smaller than 64 µs. However, where a link has a speed of 1 Gb/s which is 10 times faster than the link with a speed of 100 Mb/s, it takes only 6.4 µs to transmit the same packet through the 1 Gb/s link. That is, by considering such characteristics of the link speed and the delay time, a receiving side may identify the link speed by use of the minimum packet interval.

Meanwhile, even where the sending side transmits two packets as consecutively as possible, if the packets are passing through a plurality of links, interfering packets may occur during the transmission of the packets.

According to examples, a method of analyzing an asymmetric network having a plurality of links includes considering differences between the minimum packet intervals according to link speeds and considering differences between packet intervals affected by interfering packets.

According to examples, delay time of each of uplink and downlink is predicted from a result of analyzing the network, and a delay asymmetry ratio between the uplink and the downlink is obtained. By using the delay times and the delay asymmetry ratio, accurate time synchronization may be realized.

FIGS. 6 to 9 illustrate examples of a network analyzing method.

Figure 6:
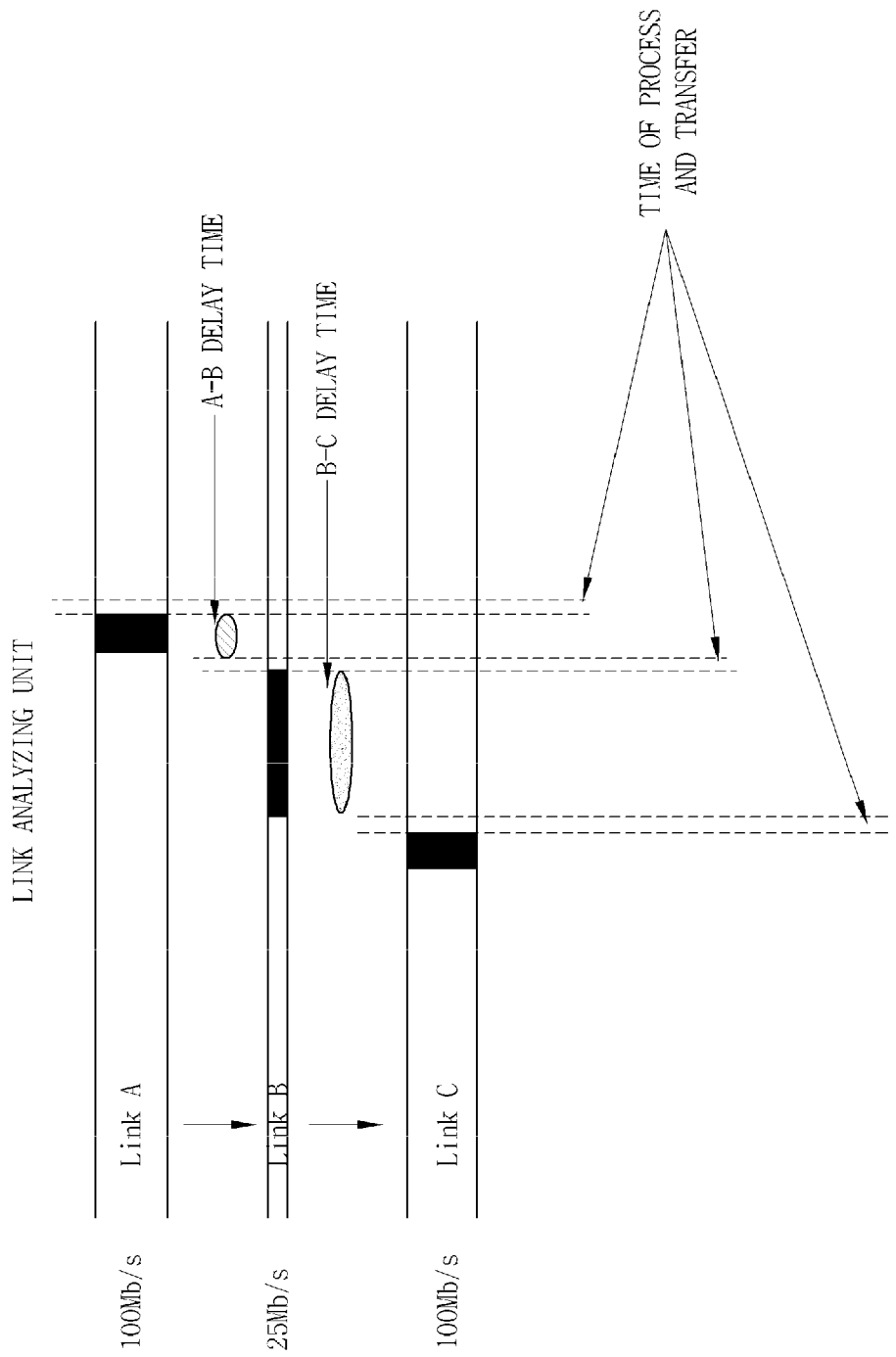
FIGS. 6 to 9 are diagrams illustrating examples for explaining a network analyzing method.

FIG. 6 shows differences in delay time between links according to link speeds. Referring to FIG. 6, as an illustration only, a packet is transmitted through three links. A link A has a speed of 100 Mb/s, a link B has a speed of 25 Mb/s, and a link C has a speed of 100 Mb/s, and the packet is transmitted from the link A to the link C.

Procedures of transmitting the packet from the link A to the link B will now be described. The link A may transfer four times more packets than the link B in a unit time. While the packet is transferred from the link A to the link B, the packet passes through an intermediate node such as a switch or a router. For example, the intermediate node waits for the packet to arrive at the node completely, and then transmits the packet to the link B once the entire packet enters the node. The above-described method is called a store-and-forward-switching method. Due to characteristics of such store-and-forward-switching method, there occurs a difference in delay time between links according to the link speed.

Then, the packet is transferred from the link B to the link C. The link B spends four times more time on receiving the entire reference packet than the link C. That is, the delay time increases by four times. This is because a store-and-forward switching method may used to process the packet to prevent the packet from being cut off during the transfer, which may occur where the link B transfers the packet to the link C before the entire packet arrives at the link B.

The store-and-forward switching method does not need to be used for transferring the packet from the link A to the link B, but substantially, most switches in the network may use the store-and-forward switching method. According to the characteristics of the store-and-forward switching method, the link speed significantly affects the period of delay time. Thus, the asymmetry of the link speed is converted into the asymmetry of the round-trip delay time. By using such characteristics of conversion between the asymmetry of the link speed and the asymmetry of the round-trip delay time, a packet interval is sampled and from the sampled packet interval, the plurality of links are detected.

Figure 7:
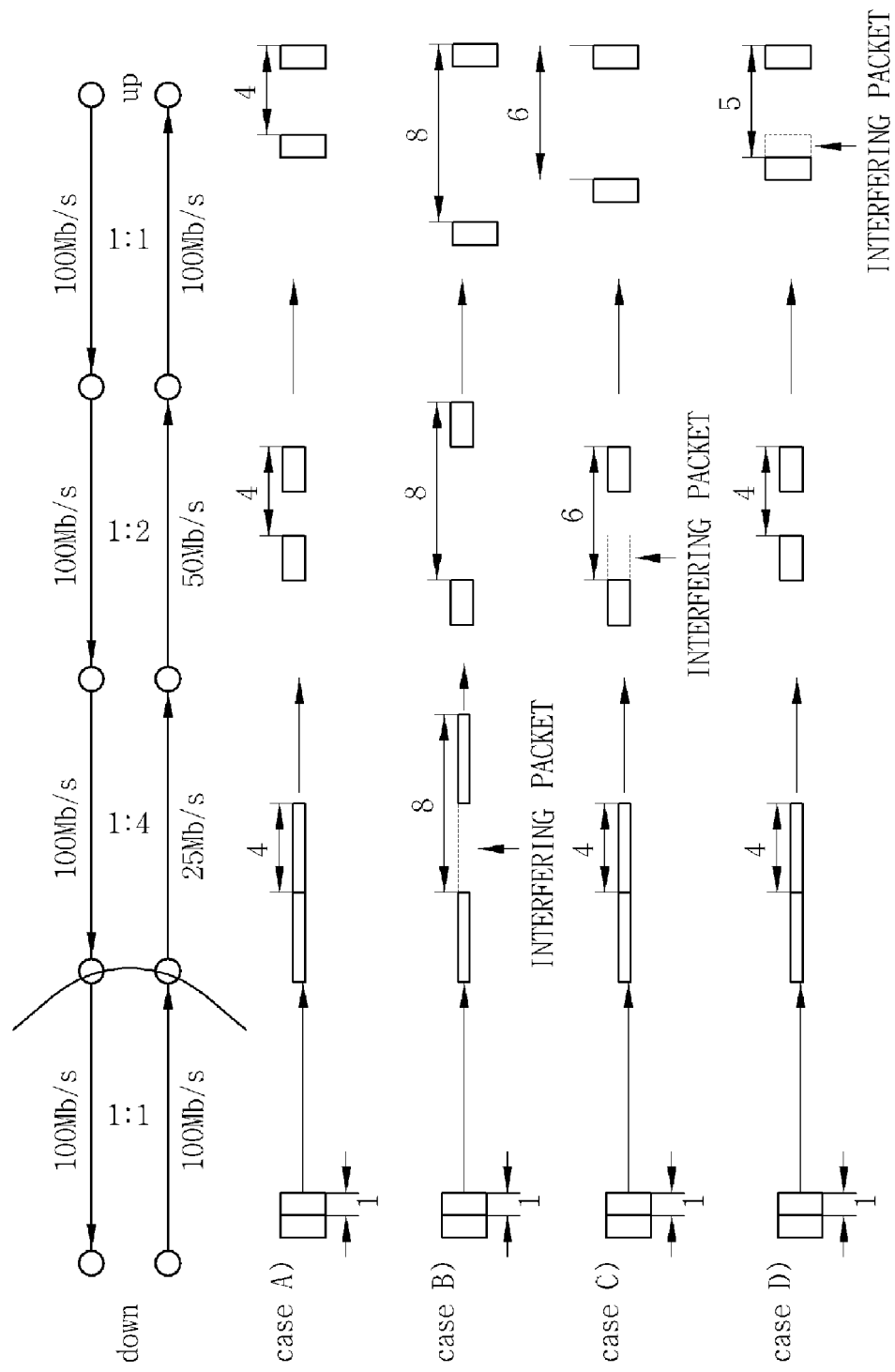

FIG. 7 shows differences in packet interval due to interfering packets. Referring to FIG. 7, while the packet passes through several nodes, the packet may be affected by other packets. That is, even where two packets are transmitted consecutively, there may be packets interfering with the transfer of the two packets passing through a plurality of nodes. For example, the interfering packets may occur as several "cars" that come to cut in between two cars, even where these two cars have started one after another, as the cars pass intersections.

However, while the cars have the length fixed, a packet length varies according to the link speed. A length of a packet which is 64 bytes in a 100 Mb/s link becomes 640 bytes in a 10 Mb/s link. Where a packet cuts in at the 10 Mb/s link, an interval between the packets increases by 640 bytes, whereas an interval between the packets increases by 64 bytes where a packet cuts in at the 100 Mb/s link. As such, the length of a packet varies according to a link speed, and the length of an interfering packet also varies according to the link speed. By observing such phenomena, it may be understood which links the packet has passed through.

Referring to FIG. 7 again, a case A shows a minimum packet interval without an interfering packet. The first packet interval is 1 byte at a 100 Mb/s link, the packet interval increases to 4 bytes at a 25 Mb/s link. Although there may be an exception, once the length of the packet has increased, normally, the length does not change even at a 50 Mb/s or the 100 Mb/s link.

In a case B, an interfering packet occurs at a 25 Mb/s link. Since the length of the packet interval increases by 4 bytes, which is the length of the interfering packet, the length of a packet interval becomes 8 bytes. As the number of the interfering packets increases, the packet interval increases by 4 bytes (i.e., 8, 12, 16 bytes and so on).

In a case C, an interfering packet occurs at a 50 Mb/s link. The packet interval increases by 2 bytes, which is the length of the interfering packet, and thus becomes 6 bytes. As the number of the interfering packets increases, the packet interval increases by 2 bytes (i.e. 6, 8, 10, 12 bytes, and so on).

In a case D, an interfering packet occurs at a 100 Mb/s link. The packet interval increases by 1 byte, which is the length of the interfering packet, and thus becomes 5 bytes. As the number of the interfering packets increases, the packet interval increases by 1 (i.e. 5, 6, 7, 8 bytes, and so on).

Since normally one to three interfering packets may cut in during a packet transfer, it may be detected what links are existing in a network by analyzing the distribution of the packet intervals. According to examples, a configuration of links in an asymmetric network is analyzed by analyzing the minimum packet interval without an interfering packet and packet intervals where the number of interfering packets increases.

Although it is described that one type of packets is transferred in the embodiments described above, it is understood that this is only an example, and that various packets with different sizes may exist in an actual network. In the case of Ethernet, packets ranging from 64 bytes to 1518 bytes may be used. In this case, the distribution of data of sampled packet intervals may look unrecognizable. However, according to a research on the distribution of packet sizes in an actual network environment, about 32 per cent of the packets are packets of 1518 bytes, about 55 per cent are packets of between 64 to 128 bytes, and the packets of other sizes are rarely present in the network. Therefore, the distribution of data sampled from the packet intervals may have a recognizable shape.

Figure 8:
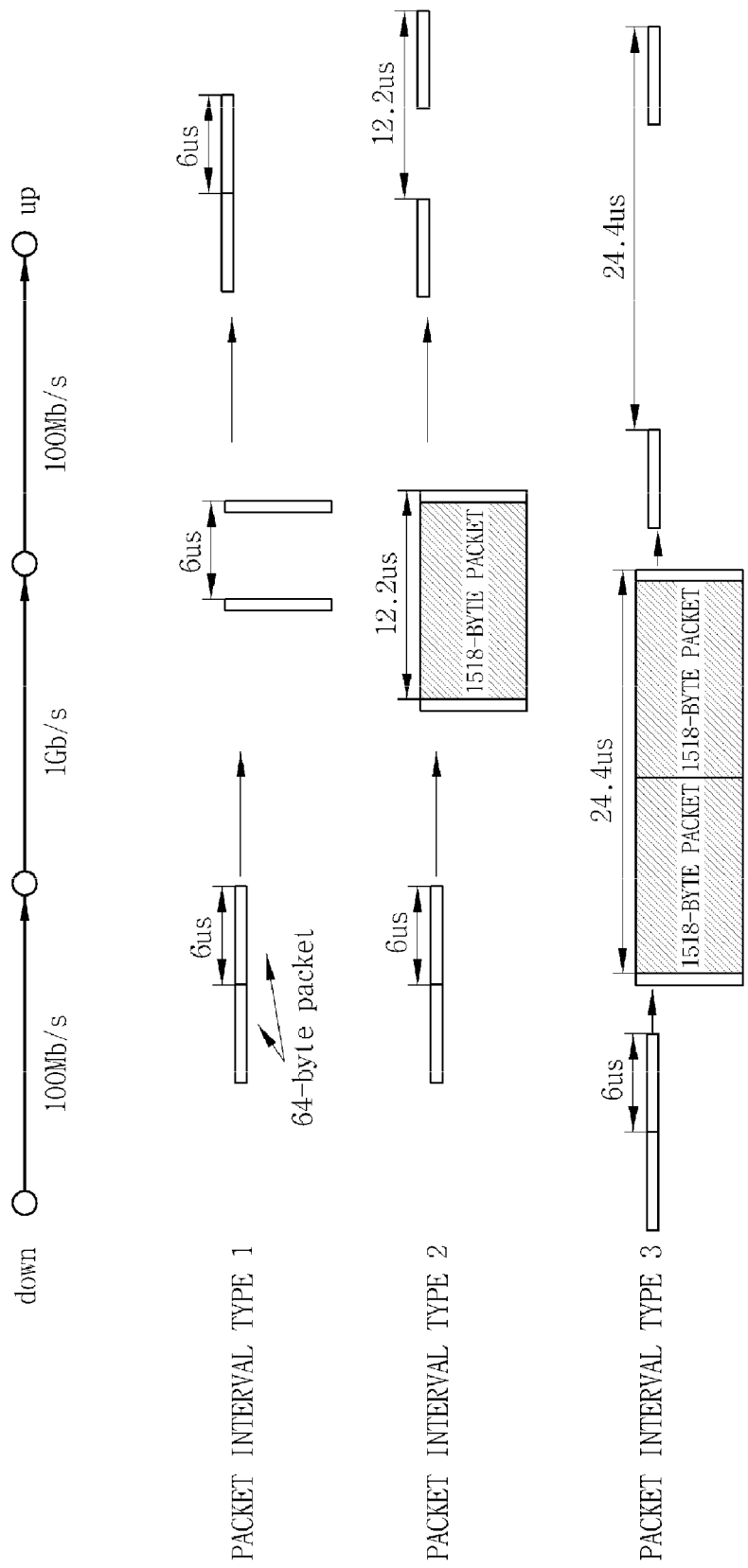

FIG. 8 shows differences in packet intervals in an actual Ethernet network. Referring to FIG. 8, packet intervals at a 100 Mb/s link, a 1 Gb/s link, and a 100 Mb/s link in a network are shown. First, in a packet interval type 1, a minimum packet interval without an interfering packet is shown. It is noted that the packet interval is 6 μs where two 64-byte packets are transferred consecutively.

A packet interval type 2 shows a packet interval where an interfering packet of 1518 bytes cuts in during the packet transfer at the 1 Gb/s link. The length of the interfering packet is 12.2 μs, and the packet interval also becomes 12.2 μs.

A packet interval type 3 shows a packet interval where two interfering packets of 1518 bytes each cut in. As illustrated in the drawing, the packet interval becomes 24.4 μs.

A packet interval caused by an interfering packet of 64 bytes is not shown since such a small interfering packet may not significantly affect the packet interval. The 64-byte interfering packet has a length of 0.6 μs at the 1 Gb/s link, and even where three 64-byte interfering packets cut in during the packet transfer, the entire length of the interfering packets is only 1.8 μs. However, in the packet interval type 1, there is already a space of 6 μs between two packets, and thus the packet interval may be hardly affected by the three 64-byte interfering packets. Accordingly, the interfering packet of 1618 bytes may affect the packet interval, and thus only such an interfering packet may be considered.

Figure 9:
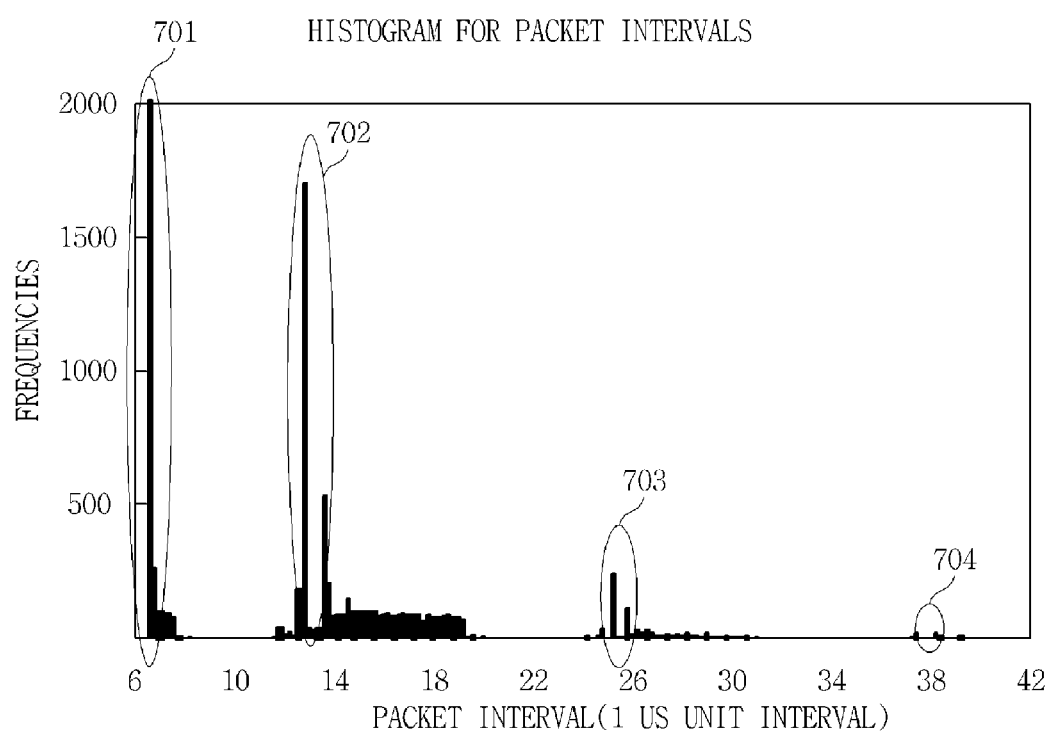

FIG. 9 shows distribution of packet intervals obtained by simulating an example in FIG. 8. As shown in FIG. 9, from the frequencies of the sampled packet intervals illustrated as a histogram, it may be noticed that samples are concentrated on several particular packet intervals. Such noticeable parts of the packet intervals which have more frequencies than any other packet intervals are called spur. In FIG. 9, several spurs may be observed.

At a first spur 701, the packet interval is 6 μs, which corresponds to the packet interval type 1 in FIG. 8. At a second spur 702, the packet interval is about 12 μs, which corresponds to the packet interval type 2 in FIG. 8. At a third spur 703, the packet interval is about 24 to 25 μs, which corresponds to the packet interval type 3 in FIG. 8. The fourth spur 704 shows the case where three 1518-byte interfering packets cut in at the 1 Gb/s link. By analyzing such data, the 1 Gb/s link and the 100 Mb/s link may be detected.

From the result of analyzing the packet intervals, the following may be understood.

First, the spur existing between 6 and 7 μs is generated at the slowest link in a network. Also, the packet interval of 6 to 7 μs becomes the minimum packet interval where the two 64-byte packets are transmitted consecutively. That is, this value is obtained by calculating the time spent for the 64-byte packet to pass through the slowest link. From the value of the packet interval, the speed of a link that the 64-byte packet is passing through may be detected.

Moreover, from the second spur 702, several bars are periodically generated at intervals of 12 μs. Such bars indicate the packet intervals where the 1518-byte interfering packet cuts in at the 1 Gb/s link. Where the interfering packet of 1518 bytes is divided by the packet interval of 12 μs, it may be detected which links the interfering packet has passed.

Where there are a plurality of links in a network, the combination of such phenomena may be observed, and the configuration of the links may be learned by analyzing the distribution of the sampled packet intervals.

Hereinafter, examples of a network analyzing method and a time synchronization method will be described. The methods which will be described below are only examples, and it will be apparent to those skilled in the art that various modifications and variations may be made without departing from the spirit or scope of the instant embodiments.

1. Generating Look-up Table

To facilitate the analysis of the above-described network, a look-up table may be used. The look-up table stores minimum packet intervals pre-calculated with respect to every two consecutively transmitted packets according to each link speed, and packet intervals calculated in consideration of at least one interfering packet cutting in between two packets. Every network may have discrete values of link speeds. Ethernet may have discrete values of 10 Mb/p, 100 Mb/p, 1 Gb/p, 10 Gb/p, and the like, and ADSL may have discrete values of 10 Mb/p, 50 Mb/s, and the like.

Spurs of each packet interval that may be generated at each link speed are calculated and stored in a table. For example, where a 64-byte packet is transmitted, possible lengths of the packet interval in bytes may be as follows. The packet interval may be (64+20) bytes, including a payload of 64 bytes and 20 bytes which is for a preamble and an inter-packet gap. Additionally, where an interfering packet of 1518 bytes cuts in between the packets, the packet interval becomes (1518+64+20) bytes. Where two interfering packets of 1518 bytes each cut in between the packets, the packet interval becomes (1518*2+64+20) bytes, and where three interfering packets cut in, the packet interval becomes (1518*3+64+20). In this manner, the number of interfering packets may be increased.

The packet interval in bytes may be calculated into μs units according to the actual link speed by using the Equation 1 below.

$$\text{packet interval} = ([(i-1)*(PRM+IPG+Lmax)+PRM+IPG+Lmin]*8)/S \quad \text{Equation 1}$$

Here, 'i' denotes the order of spurs, PRM represents a preamble, IPG represents an inter-packet gap, Lmin denotes the minimum packet size, Lmax denotes the maximum packet size, and 'S' represents a link speed.

For example, using the Equation 1, a value of a packet interval at the third spur at the 100 Mb/s link is 252.8 μs. That is, i=3, PRM=8, IPG=12, Lmax=1518, Lmin=64, and S=100, and thus the packet interval is ([2*(8+12+1518)+8+12+64]*8(bits))/100, that is, 282.8 μs.

In such a manner, by using the Equation 1, a look-up table may be made to include every minimum packet interval without an interfering packet at each possible link speed and every possible packet interval with at least one interfering packet. An example of a look-up table is shown below.

TABLE 1

| Spur sequence | Link speed | 1 | 2 | 3 | 4 | 5 | ... |
|---|---|---|---|---|---|---|---|
| bytes | | 84 | 1602 | 3120 | 4638 | 6156 | ... |
| Packet interval | ... | ... | | | | | ... |
| (μs) | 10 Mb/s | 67.2 | 1297.6 | 2528.0 | 3974.4 | 4988.8 | ... |
| of corresponding | 50 Mb/s | 13.44 | 259.52 | 505.6 | 794.88 | 997.76 | ... |
| spur | 100 Mb/s | 6.72 | 129.76 | 252.8 | 397.44 | 498.88 | ... |
| | 1 Gb/s | 0.672 | 12.976 | 25.28 | 39.74 | 49.88 | ... |
| | ... | ... | ... | ... | ... | ... | ... |

Using the generated look-up table, examples of a method of analyzing an asymmetric network having a plurality of links is described below.

2. Network Analysis Algorithm—Identifying a Type of a Link

According to general aspects, two packets are transmitted consecutively through each of an uplink and a downlink, and packet intervals between the received two packets are sampled. Based on frequencies of the sampled packet intervals, a histogram is made.

With reference to the above look-up table, spurs of the sampled packet intervals are searched from the histogram. From the look-up table, it may be checked if the spur exists in a calculated packet interval at each link. Alternatively, it may be checked to which value of the look-up table the spurs in the histogram correspond. The most frequent packet interval in the histogram is determined as a dominant spur. By using the packet interval of the dominant spur, a link with the slowest link speed may be detected.

All packet intervals considered as dominant spurs in the histogram are checked by using the look-up table.

Once the spur has been found, it is assumed that corresponding links are present.

A speed of a first link may be obtained from an interval value of a timestamp recorded on a packet upon starting a packet transfer. In other words, by checking which link has the first spur that corresponds to the interval value, a first link speed of a slave node may be detected.

The links possible to be present in the network may be disregarded based on example criteria 1) through 4) described below. The criteria are described in an order of priority, and where several criteria are applied, a criterion with a higher priority is applied first.

1) The dominant spur is considered to exist at a link even where it has only a first spur.

2) A spur at the left of the dominant spur does not need to be present. For example, where a predicted location of a first spur at the 1 Gb/s link is at the left of the dominant spur, and a second spur is located at the right of the dominant spur, the first spur may not be needed, but the second spur should be present. Where the link does not meet this condition, it is determined that the corresponding link is not present in the network.

3) In the spurs other than the dominant spur, a first spur and a second spur should be present at each of links having different speeds.

4) Where ith spur is found at a corresponding link, a (i+1)th spur should exist sequentially. Where there is a (i+2)th spur without a (i+1)th spur, it is determined that the corresponding link does not exist.

An example to which the above-specified network analysis algorithm is applied will now be described. Based on the graph in FIG. 9 showing the simulation result of the sampled packet intervals, the network analysis algorithm will be applied.

The first link of a slave node has an interval value of 6.72 μs of a timestamp recorded upon starting of a packet transfer. According to the above, a speed of the first link may be obtained from the interval value. That is, by checking which link has the first spur that corresponds to the interval value, it may be understood that the first link of the slave node has a speed of 100 Mb/s.

The dominant spur is at between 6 to 7 μs, and the second, the third, and the fourth spurs are at between 12 to 33 μs, between 25 to 26 μs, and between 36 to 38 μs, respectively. The following table shows the data of the look-up table corresponding to the spurs in the histogram. Here, 1 μs is the measurement unit, and the value is rounded up.

TABLE 2

| | Spur sequence | 1 | 2 | 3 | 4 | 5 | ... |
|---|---|---|---|---|---|---|---|
| Packet interval of corresponding spur (μs) | 100 Mb/s | 7 | 130 | 253 | 398 | 499 | ... |
| | | O | X | X | X | X | |
| | 1 Gb/s | 1 | 13 | 26 | 40 | 50 | ... |
| | | X | O | O | O | X | |

According to the above, once the spur has been found, it is assumed that corresponding links are present. Thus, it may be found from the Table 2 that there are the 100 Mb/s link and the 1 Gb/s link additionally in the network. The dominant spur is at between 6 to 7 μs.

According to the criterion 1) above, the dominant spur is considered to exist at a link even where it has only a first spur. Thus, it is determined that there is the 100 Mb/s link in the network. Although all the above criteria are satisfied except for 3), this criterion has a lower priority, and it is determined that the 100 Mb/s link exists in the network.

With regard to the 1 Gb/s link, it is determined that the 1 Gb/s link exists since the criterion 2) is satisfied, which has a higher priority that the criterion 3) that has not yet been satisfied. In other words, since a spur predicted to be at 0.672 μs at the 1 Gb/s link will be placed at the left of the current dominant spur at between 6 to 7 μs, this spur may be disregarded.

As described above, the distribution of the sampled packet intervals may be analyzed by using the look-up table, and the link configuration of the asymmetric network may be detected. As the result, it is recognized that the network of the above example includes the 100 Mb/s link, the 1 Gb/s link, and the 100 Mb/s link. Such an algorithm is applied to each of the uplink and the downlink, so that each link configuration may be analyzed.

3. Obtaining Delay Asymmetry Ratio

Based on the result of analyzing the uplink and the downlink, the uplink delay time and the downlink delay time may be calculated. It is assumed that there are j uplinks and k downlinks.

In accordance with various examples, the delay asymmetry ratio may be obtained by the Equation 2 below.

$$\sum_{i=0}^{j-1} \frac{1}{S_i} : \sum_{i=0}^{k-1} \frac{1}{S_i} \quad \text{Equation 2}$$

Here, the last link of each of the uplink and the downlink, that is, a jth link and kth link are left out. The link connected to the last node measures the arrival time of the first bit of a packet. In such a manner, the delay asymmetry ratio may be easily obtained, and time synchronization may be accurately performed.

Where a processing delay is considered for more accurate compensation, the delay asymmetry ratio may be obtained by the Equation 3 below. The ith processing delay time is denoted by Pi, and the packet size is denoted by Lmin.

$$\sum_{i=0}^{j-1} \left( \frac{1}{S_i} * L_{min} * 8 + P_i \right) : \sum_{i=0}^{k-1} \left( \frac{1}{S_i} * L_{min} * 8 + P_i \right) \quad \text{Equation 3}$$

Here, Pi may be a value pre-stored in a database, or a typical value. Generally, the minimum processing delay time of a switch is smaller than 1 μs.

For example, the delay asymmetry ratio is obtained by the Equation 3 where the links are configured in the order of 100 Mb/s, 10 Mb/s, 100 Mb/s, 1 Gb/s, and 100 Mb/s in a downlink direction, and the links are configured in the order of 100 Mb/s, 1 Gb/s, 100 Mb/s, and 50 Mb/s in an uplink direction. Where it is assumed that the processing delay for each node is 1 μs, the entire processing delay is 4 μs since the packet has passed four switches, and the actually measured minimum round-trip delay time is 105 μs.

In the case of the downlink, $$\sum_{i=0}^{j-1} \left( \frac{1}{S_i} \times L_{min} \times 8 + P_i \right) = 64 \times 8 \times \left( \frac{1}{100} + \frac{1}{10} + \frac{1}{100} + \frac{1}{1000} \right) + 4 = 65.9$$

In the case of the uplink, $$\sum_{i=0}^{k-1} \left( \frac{1}{S_i} \times L_{min} \times 8 + P_i \right) = 64 \times 8 \times \left( \frac{1}{100} + \frac{1}{1000} + \frac{1}{100} + \frac{1}{50} \right) + 4 = 24.99$$

Thus, the delay asymmetry ratio is downlink:uplink=65.9:24.99

Where the minimum round-trip delay time (105 μs) is halved as in a conventional method, it becomes 45.5 μs. The difference in the uplink speed value between the conventional method and a method using the delay asymmetry ratio in accordance with various examples described herein is approximately 20.5 μs. When considering a desired error at a femto cell is 1 μs, such an error may be significantly big. Thus, the delay asymmetry ratio in accordance with various examples described herein enables comparatively accurate time synchronization.

4. Correction Algorithm

To verify the network analysis algorithm in accordance with various examples described herein, the below Equation 4 may be used.

$$\sum_{i=0}^{j-1} \left( \frac{1}{S_i} * L_{min} * 8 + P_i \right) + \sum_{i=0}^{k-1} \left( \frac{1}{S_i} * L_{min} * 8 + P_i \right) \cong \min(RTT) \quad \text{Equation 4}$$

Here, RTT is an actually measured round-trip delay time. Where the analyzed link configuration of the network cannot meet the Equation 4, the link configuration may be corrected as follows:

1) Add a duplicated link: where the right side of the equation is greater than the left side, it is assumed that a particular link is duplicated in the network, and each link is duplicated to find the link configuration satisfying the Equation 4.

2) Eliminate a link: where the left side of the equation is greater than the right side, links having the highest measurement error are eliminated one by one to detect the link configuration satisfying the Equation 4.

According to certain embodiments described above, in an asymmetric network having a plurality of links, each link may be analyzed by using distribution of packet intervals. A delay asymmetry ratio between an uplink and a downlink may be obtained based on the analyzed link configuration, and time synchronization may be performed on the basis of the obtained delay asymmetry ratio. Accordingly, more accurate time synchronization may be realized.

The methods described above may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of analyzing a network having a plurality of links, the method comprising:
    performing a plurality of samplings of a packet interval between two packets transmitted consecutively; and
    analyzing configuration of the plurality of links included in the network based on the plurality of samplings, the analyzing of the configuration comprising detecting the plurality of links included in the network, the detecting of the plurality of links comprising interpreting distribution of the plurality of samplings using a look-up table that stores possible packet intervals of each link.

2. The method of claim 1, wherein the look-up table stores, according to each link speed, a packet interval calculated with respect to two consecutive packets and a packet interval calculated in consideration of at least one interfering packet cutting in between the two consecutive packets.

3. The method of claim 1, wherein the performing of the plurality of samplings comprises:
    transmitting the two packets consecutively to a master node;
    receiving two packets from the master node each having a time stamp recorded therein; and
    sampling the packet interval with respect to each link by using the time stamp recorded in each packet.

4. The method of claim 1, wherein the analyzing of the configuration further comprises:
    recognizing distribution of the plurality of samplings based on frequencies of the plurality of samplings;
    detecting at least one spur of a packet interval with a comparatively high frequency; and
    identifying each link included in the network by using the detected at least one spur.

5. The method of claim 4, wherein the identifying of the each link comprises identifying the each link with reference to a look-up table that stores, according to each link speed, a packet interval calculated with respect to two consecutive packets and a packet interval calculated in consideration of at least one interfering packet cutting in between the two consecutive packets.

6. The method of claim 1, wherein:
    the network includes an asymmetric network; and
    the plurality of links has different uploading and downloading speeds.

7. An apparatus for use in a network having a plurality of links, the apparatus comprising:
    a sampling unit configured to perform a plurality of samplings of a packet interval between two packets transmitted consecutively; and
    a link analyzing unit configured to:
        analyze configuration of the plurality of links included in the network based on distribution of the plurality of samplings; and
        interpret the distribution of the plurality of samplings by use of a look-up table that stores possible packet intervals for each link to detect the plurality of links included in the network.

8. The apparatus of claim 7, wherein the look-up table stores, according to each link speed, a packet interval calculated with respect to two consecutive packets and a packet interval calculated in consideration of at least one interfering packet cutting in between the two consecutive packets.

9. The apparatus of claim 7, further comprising:
    a synchronizing unit configured to:
        obtain a delay asymmetry ratio between an uplink and a downlink based on the analyzed link configuration; and
        perform time synchronization based on the obtained delay asymmetry ratio.

10. The apparatus of claim 7, wherein:
    the network comprises an asymmetric network; and
    the plurality of links has different uploading and downloading speeds.

11. The apparatus of claim 7, wherein the sampling unit is further configured to:
    transmit the two packets consecutively to a master node;
    receive two packets from the master node each having a time stamp recorded therein; and
    sample the packet interval with respect to each link by using the time stamp recorded in each packet.

12. The apparatus of claim 7, wherein the link analyzing unit is further configured to:
    recognize the distribution of the plurality of samplings based on frequencies of the plurality of samplings;
    detect at least one spur of a packet interval with a comparatively high frequency; and
    identify each link included in the network by using the detected at least one spur.

* * * * *